United States Patent [19]

Arai

[11] 3,893,142
[45] July 1, 1975

[54] ELECTRIC MOTOR DRIVEN AUTOMATIC FILM ADVANCE
[75] Inventor: Akihiro Arai, Tokyo, Japan
[73] Assignee: Asahi Kogaku Kogyo Kabushiki Kaisha, Tokyo, Japan
[22] Filed: July 17, 1973
[21] Appl. No.: 380,049

[30] Foreign Application Priority Data
July 28, 1972  Japan............................... 47-88785

[52] U.S. Cl. ............................................... 354/204
[51] Int. Cl. .......................................... G03b 19/04
[58] Field of Search......................... 95/31; 354/204

Primary Examiner—John M. Horan
Attorney, Agent, or Firm—Wolder & Gross

[57] ABSTRACT

A camera includes an electric motor driven mechanism for advancing the film and charging and releasing the shutter and is provided with a switch actuator which is motivated by the stopping of the film take-up, a shutter release which is locked and is unlocked upon a film frame release and a shutter release actuator motivated by the motor following the advance of a film frame. The motor, a battery, an interlock switch, and a manual switch are connected in series between the arm of a changeover switch and one of its contacts, the other contact being connected to the junction of the interlock switch and manual switch. The interlock switch is closed when the shutter release actuator is retracted or when it is fully advanced and the shutter release member is unlocked and is otherwise open. A similar mechanism with the interlock switch in an opposite phase controls the energization of a signal lamp. The switch arm is in engagement with the second contact during the film advance.

6 Claims, 5 Drawing Figures

ELECTRIC MOTOR DRIVEN AUTOMATIC FILM ADVANCE

BACKGROUND OF THE INVENTION

The present invention relates generally to improvements to camera motivating and sequencing mechanism and it relates more particularly to an improved electric motor driven camera automatic motivating and sequencing mechanism in which the energizing network is disabled upon the depletion of the film.

It is well known to preset a predetermined number of film frames into an indexing member such as a film frame disc in an electrical automatic film transport mechanism so that when the number of exposed film frames reaches this preset value, the electric motor which drives the film transport mechanism is automatically deenergized. This type of arrangement which has been heretofore proposed possesses many disadvantages in that, when the number of frames of actually charged film is fewer than the value preset in the frame number disc, the electric motor continues to be energized until the preset value is reached through a series of or partially omitted film transport operations. Accordingly, the conventional electrically energized automatic film advancing mechanism leaves much to be desired.

SUMMARY OF THE INVENTION

It is a principal object of the present invention to provide an improved electric motor driven camera automatic film advance mechanism.

Another object of the present invention is to provide an improved electric motor film advance mechanism in which the motor energizing network is open upon the depletion of the film.

Still another object of the present invention is to provide an improved electric motor film advance mechanism in which the motor energizing network is automatically disabled upon the depletion of the film and in which any indexing or preadjustment is obviated.

A further object of the present invention is to provide an improved mechanism of the above nature characterized by its reliability, ruggedness and great versatility and adjustability.

The above and other objects of the present invention will become apparent from a reading of the following description taken in conjunction with the accompanying drawings which illustrate preferred embodiments thereof.

It a sense, the present invention contemplates the provision in a camera having a known sequencing and motivating mechanism including a drive motor, film take-up and shutter charging means, a locked shutter release member which is unlocked upon a film frame advance and a shutter release actuator advanced by the motor following a film frame advance, a control circuit including a switch arrangement transferrable between open and and closed first and second states, means for positioning the switch arrangement in one state in response to a first condition in which the shutter release actuator is retracted and a second condition in which the actuator is advanced and the release member is unlocked and for positioning the switch arrangement in a second state in response to a third condition in which the actuator is advanced and the release member locked and means responsive to the control circuit. The switch arrangement may consist of a pair of parallel switches which are open under the third condition and one of which is closed under the first or second conditions or may be a single switch which is open or closed under the first or second conditions and in an opposite position under the thrid condition. The circuit, in its preferred form, deenergizes the motor when the third condition occurs.

The improved mechanism is simple, reliable, rugged and versatile, obviates the necessity of any presetting and overcomes the drawbacks of the conventional mechanisms.

DESCRIPTION OF THE PREFERRED EMBODIMENTS

Figure 1:
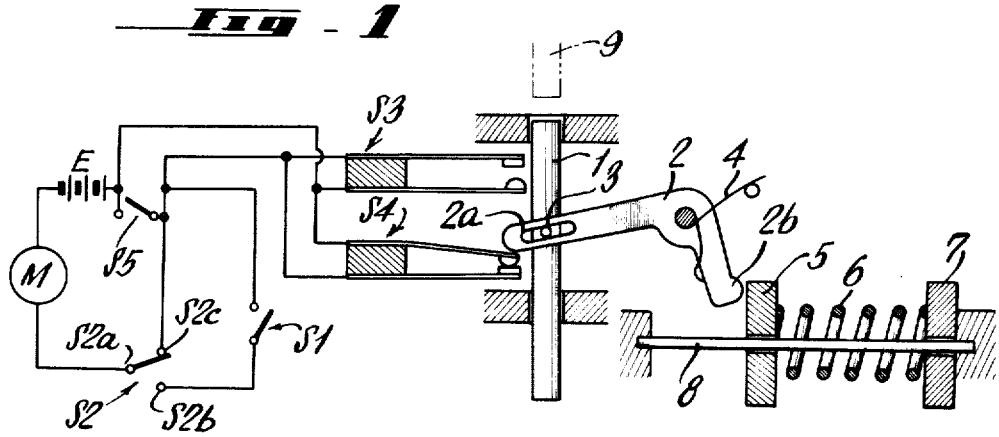
FIG. 1 is a longitudinal sectional view and schematic diagram of a mechanism embodying the present invention illustrated in one stage of its operation.
Figure 2:
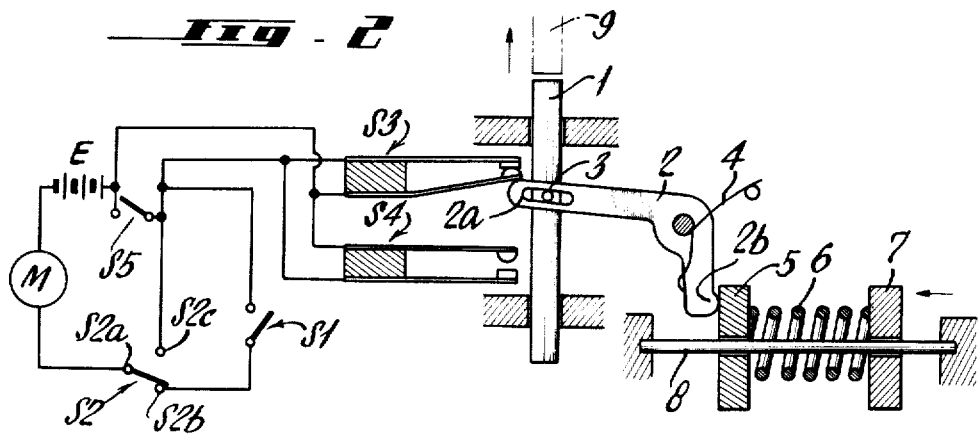
FIG. 2 is a view similar to FIG. 1 illustrated in a second stage.
Figure 3:
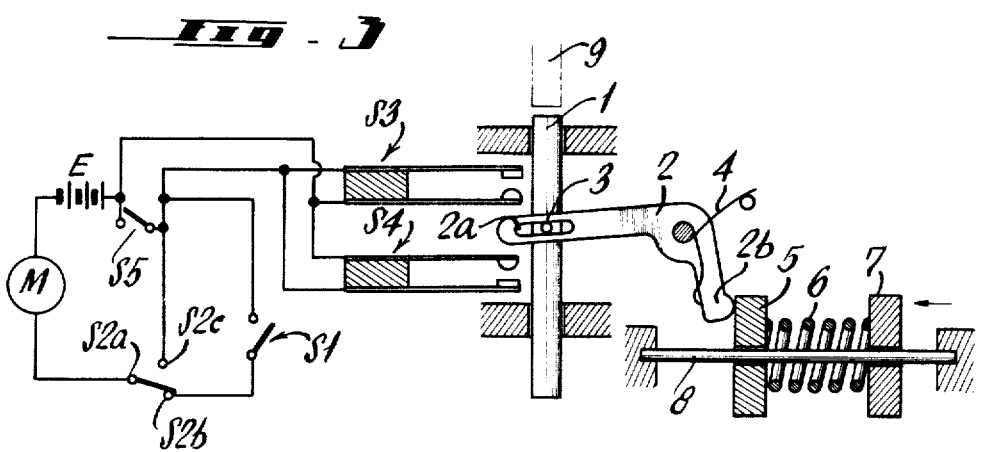
FIG. 3 is a view similar to FIG. 1 illustrated in a third stage.

Referring now to the drawings and particularly FIGS. 1 to 3 thereof which illustrate a preferred embodiment of the present invention, the reference letter M generally designates an electric motor which motivates a well known camera film take-up, shutter cocking and releasing and sequencing mechanism of known construction and which is thus not illustrated or described in detail. The mechanism incudes a film take-up driven through a transmission by the motor M, a switch actuator responsive to the stopping of the film take-up consequent to the termination of a full film frame advance or the depletion of the film, a shutter release member 9 which is movable from a retracted to an advanced position to release the shutter and which is locked in its retracted position until a film frame is fully advanced, and an actuator member which responds to the rotation of motor M after the advance of the switch actuator to urge collar 7 to the left, as will be hereinafter described.

The shutter release member 9 is vertically movable between a raised shutter release position and a depressed retracted position and a release member actuator rod 1 is vertically slideably supported coaxial with release member 9 and is raisable into engagement with release member 9 and to urge release member 9 to its raised position. An angular lever 2 is pivotly supported for swinging about its elbow and includes a depending arm terminating in a protection 2b and a longitudinally extending arm having a longitudinal slot 2a proximate its end slideably engaging a follower pin 3 on actuator slide rod 1 so that clockwise and counterclockwise swinging of lever 2 as viewed in the drawing respectively raises and lowers actuator rod 1.

A stationary longitudinally extending horizontal rod 8 is suitably mounted below the lever projection 2b and slideably supports a pair of longitudinally spaced similar collars 5 and 7 which entrap and embrace between them a helical compression spring 6 coaxial with the rod 8. A hairpin spring 4 engages the lever 2 to resiliently bias it in a counterclockwise direction to urge the lever projection 2b toward the confronting face of collar 5 and the actuator rod 1 toward its depressed position. The collar 7 is normally in its right hand position and is urged to the left by the camera mechanism actuator member upon rotation of motor M following the film take-up as explained above.

The free end of the longitudinal arm is positioned between the resilient contact arms of a pair of vertically spaced normally open upper switch S3 and lower switch S4 so that when the lever 2 is in its most counterclockwise position lower switch S4 is closed and upper switch S3 is open and when in its clockwise most position switches S3 and S4 are closed and open respectively. When the lever 2 is in an intermediate position as shown in FIG. 3, both switches S3 and S4 are open.

The motor M has one terminal connected to the negative terminal of a battery E and its opposite terminal connected to the arm S2a of a double through switch S2, the arm S2a alternatively engaging switch contacts S2b and S2c. Switch contact S2c is connected through the parallel connected switches S3 and S4 to the positive terminal of battery E and switch contacts S2b and S2c are connected by a normally open manually operable switch S1. A manually operable normally open switch S5 connects the battery positive terminal to switch contact S2c. The switch arm S2a is mechanically coupled to the camera mechanism switch actuator, as described above, so that during the winding of the film switch arm S2a engages switch contact S2c and upon the stopping of the film take-up the switch arm S2a is transferred to switch contact S2b.

Considering now the operation of the mechanism described above, the condition thereof during film advance is illustrated in FIG. 1, the automatic stopping switch S4 being closed, establishing the automatic energization circuit E⊕-S4-S2c-S2a-M-E⊖, and, as a result, the electric motor M is energized and rotated to effect the film advance through a transport mechanism which is not shown. Upon the completion of a film frame advance, the automatic-manual circuit change-over switch arm S2a is transferred in operative association with the transport mechanism to switch contact S2b and the motor M is deenergized and stops. Upon closure of the starting switch S1, the manual energization circuit E⊕-S4-S1-S2b-S2a-M-E⊖ is established to energize and rotate the motor M. Operation of the shutter release actuator is accordingly effected, while the film transport is stopped, by the above explained release mechanism, which is not shown. Thus, in FIG. 1, displacement of the collar 7 toward the left displaces the collar 5 under action of the spring 6 and then clockwise rotates the release lever 2 which, in turn, displaces the release actuator pin 1 upward so as to accomplish the shutter release by way of members 1 and 9. Simultaneously the automatic stopping switch S4 is opened while the switch S3 is closed. Change-over of the automatic-manual circuit change-over switch S2 also is affected by the release mechanism, not shown. Operation of these switches is continuous and free of interruption due to factors such as the inertia of the respective parts.

The automatic energization circuit E⊕-S3-S2c-S2a-M-E⊖ is established to energize and rotate the motor M and upon completion of the shutter release operation effected by the release mechanism not shown while film transport is stopped, the collar 7, the collar 5, the release lever 2 and the release actuator pin 1 return to their initial positions. As a result, the automatic stopping switch S3 is opened and the switch S4 is closed.

The automatic energization circuit E⊕-S4-S2c-S2a-M-E⊖ serves to maintain the motor M energized. Film advance is again initiated and the operation as described above is repeated. Now, upon the completion of the full film advance, a change-over is effected by a mechanism for change-over not shown from the mechanism for film transport to the mechanism for release as the transport torque increases as a consequence of film depletion and operation of the release is initiated, although the film frame advance is not completed. The shutter release locking mechanism serves to limit the displacement of the release pin 9, so that even when the collar 7 advances toward the left as seen in FIG. 1, the collar 5, the release lever 2 and the release actuator pin 1 are stopped during such advance under action of the release pin 9 and the difference is absorbed by the spring 6. The release lever 2 is stopped at an intermediate position so that the automatic stopping switches S3 and S4 are kept open with a result that the motor M is deenergized and stopped.

To overcome the automatic stopping effect after operation such as for recharging of the film, the film may be manually transported in the conventional manner to a position at which the release is possible so as to eliminate the biasing effect of the spring 6 so that the release may be effected and the automatic stopping switch S3 may be closed or the circuit may be temporarily closed by the closing of the automatic stop removing switch S5 to effect film transport and thereby the release lever 2 may be returned to its initial position so that the switch S4 may be closed for further film advance.

Figure 4:
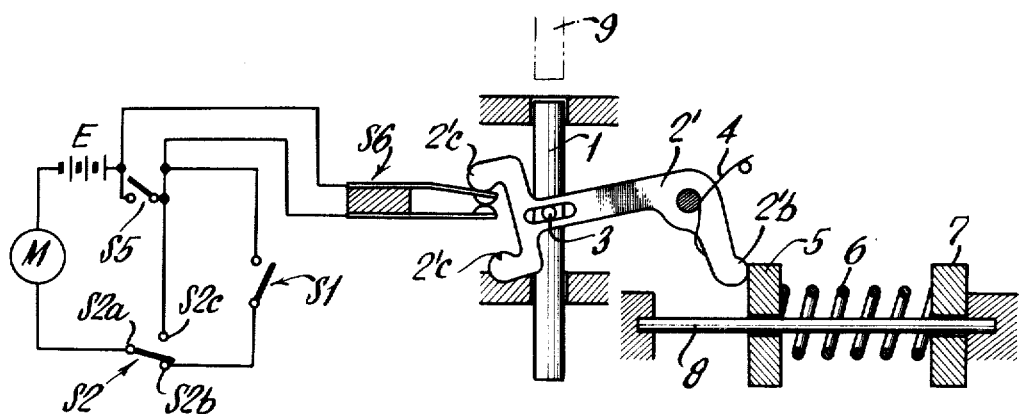
FIG. 4 is a view similar to FIG. 1 of another embodiment of the present invention; and, FIG. 5 is a view similar to FIG. 1 of a further embodiment of the present invention.

The embodiment of the present invention illustrated in FIG. 4 of the drawing differs from that first described only in that a single normally open switch S6 is substituted for the two parallel switches S3 and S4 and a lever 2' of different configuration than the lever 2. Specifically, the lever 2' differs from the lever 2 in that the horizontal longitudinal arm of lever 2' terminates in a yoke including a pair of outwardly directed vertically spaced parallel arms disposed above and below the resilient arms of the switch S6. Thus, when the lever 2' is in its extreme clockwise or counterclockwise position the lower or upper yoke arm 2'C engages an arm of switch S6 to close the switch and when the lever 2' is in an intermediate position the arms of switch S6 are disengaged by the yoke arms 2'C and the switch is open. In operation and in all other respects the embodiment shown in FIG. 4 is similar to that first described.

Figure 5:
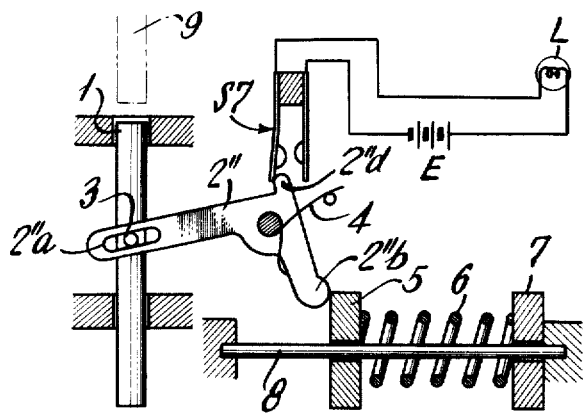

In FIG. 5 of the drawing there is illustrated another embodiment of the present invention which provides a visual signed upon the depletion or ending of the film. A lever 2'' corresponding to and activated and responding in the manner of the lever 2 of the first described embodiment includes a switch actuating finger 2''d projecting from the elbow of the lever 2'' into the space between the resilient contact arms of a normally closed switch S7. A lamp L is connected in series with the switch S7 across a battery E. Thus, when the lever 2'' swings to either of its extreme positions, as described above, the finger 2''d opens the switch S7 and the lamp energizing circuit. However, when the lever 2'' is in its intermediate position consequent to the depletion of the film the finger 2''d is intermediate the arms of switch S7 to leave the switch in its closed position and energize the lamp L.

While there have been described and illustrated preferred embodiments of the present invention, it is apparent that numerous alterations, omissions and additions may be made without departing from the spirit thereof.

I claim:

1. An automatic stopping mechanism in a camera of electrical automatic film transport type comprising:
    a. means including a drive motor for advancing a film a unit frame, and charging the camera shutter;
    b. a shutter release actuator member movable between advanced and retracted positions and urged to its advanced position by said drive motor following full film frame advance or completion of a film;
    c. means including a shutter release locking mechanism for stopping said shutter release actuator member at an intermediate position between said retracted and advanced positions;
    d. a current source for said drive motor; and
    e. a control circuit including a switching mechanism mounted in said control circuit including said drive motor and current source at least during the time when the film frame is advanced or the shutter is charged, said switching mechanism by contact with said shutter release actuator member being in a closed position whereby said motor is energized when said shutter release actuator member is either in said advanced or in said retracted position and in an open position when the shutter release actuator member is in an intermediate stop position whereby said motor is deenergized and stops automatically.

2. An automatic stopping device of claim 1 wherein said shutter release actuator member comprises:
    a. a pair of slide elements and a spring element entrapped between the slide elements and movable from their respective retracted positions to their respective advanced positions in response to shutter release operation;
    b. a lever swingable from its retracted position to its advanced position in response to the movement of said elements.
    c. a reciprocating slide rod movable in response to the swinging movement of said lever;
    d. a release pin disposed in the range of movement of said slide rod, said shutter release locking mechanism locking said pin only when the film frame cannot be advanced thereby stopping said rod in an intermediate position.

3. An automatic stopping mechanism of claim 2 wherein said spring absorbs movement of said element when said rod is stopped in the intermediate position.

4. An automatic stopping mechanism of claim 2 wherein said switching mechanism comprises normally open pair of switches inserted in said control circuit in parallel with each other, one of said switches being closed by said lever when the latter is in its retracted position, the other of said switches being closed by said lever when the latter is in its advanced position, both switches being in an open position when the lever is in the intermediate position.

5. An automatic stopping mechanism of claim 2 wherein said switching mechanism comprises a switch, said lever has at one end a two-forked swingable tip portion, between which said switch is so disposed so that the switch is in a closed position abutting against either of the swingable tips of the lever when the lever is in the advanced or retracted position and in an open position with the lever in the intermediate stop position.

6. An automatic stopping mechanism of claim 2 wherein there is further provided a warning circuit having an alarm such as a lamp, a current source and a switch, said switch being normally open and being closed by the lever with the latter stopped in the intermediate position so as to give a warning.

* * * * *